Oct. 19, 1943.   P. MANCUSO   2,332,101
CONTAINER CLOSURE FORMING BLANK AND METHOD OF PRODUCING THE SAME
Filed Feb. 20, 1939   3 Sheets-Sheet 1
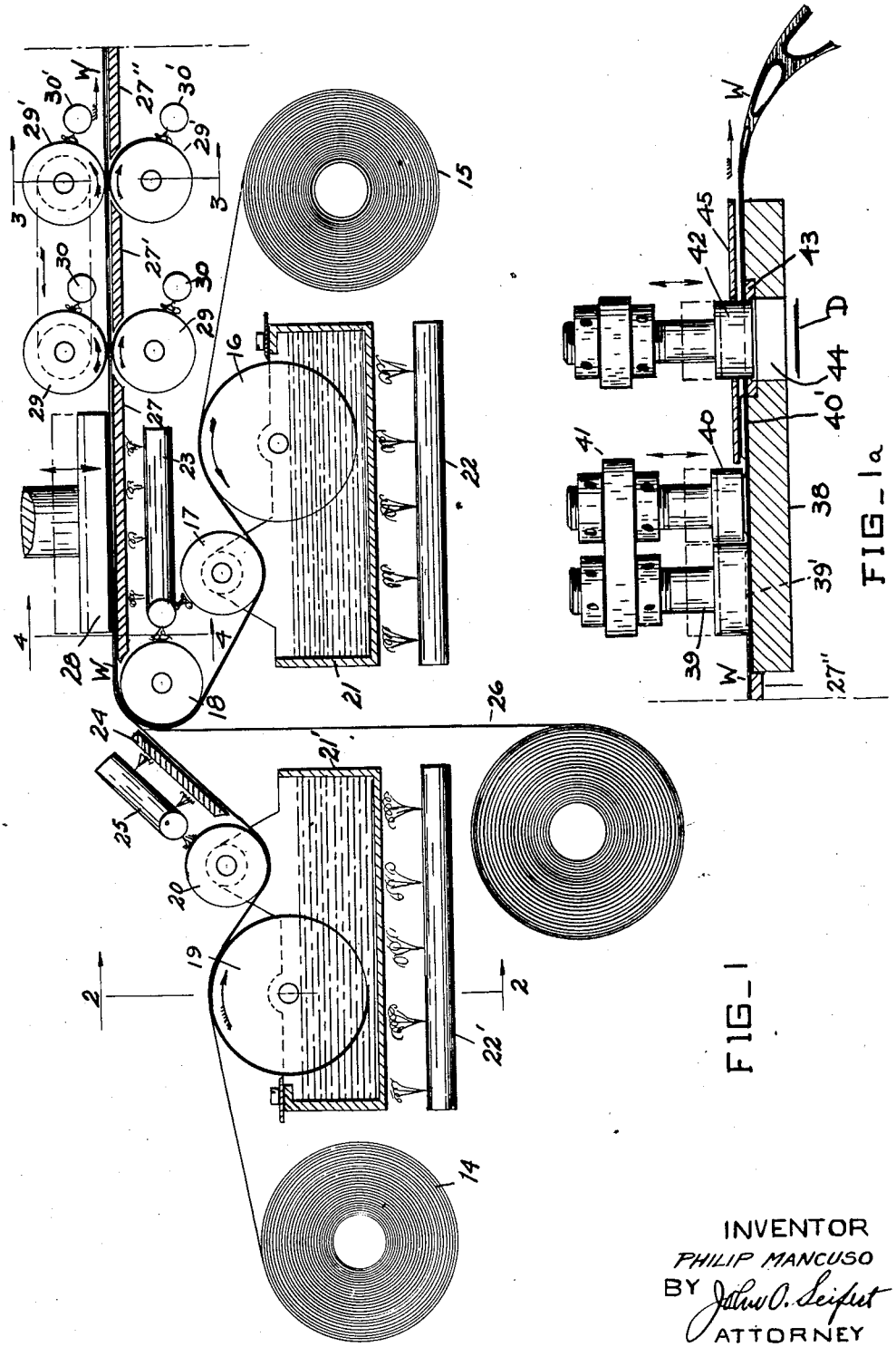
INVENTOR
PHILIP MANCUSO
BY John O. Seifert
ATTORNEY Oct. 19, 1943.   P. MANCUSO   2,332,101
CONTAINER CLOSURE FORMING BLANK AND METHOD OF PRODUCING THE SAME
Filed Feb. 20, 1939   3 Sheets-Sheet 2
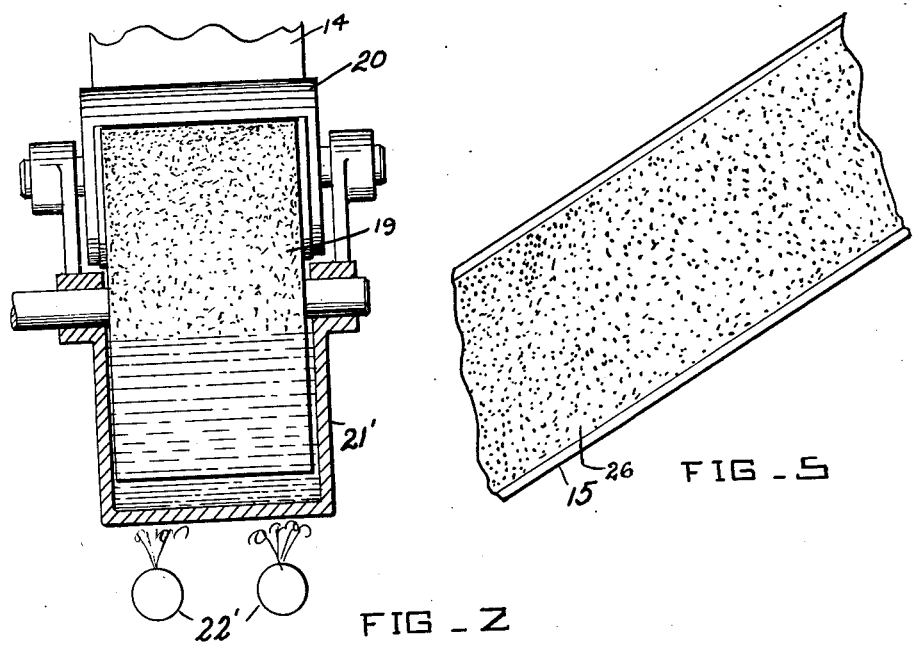
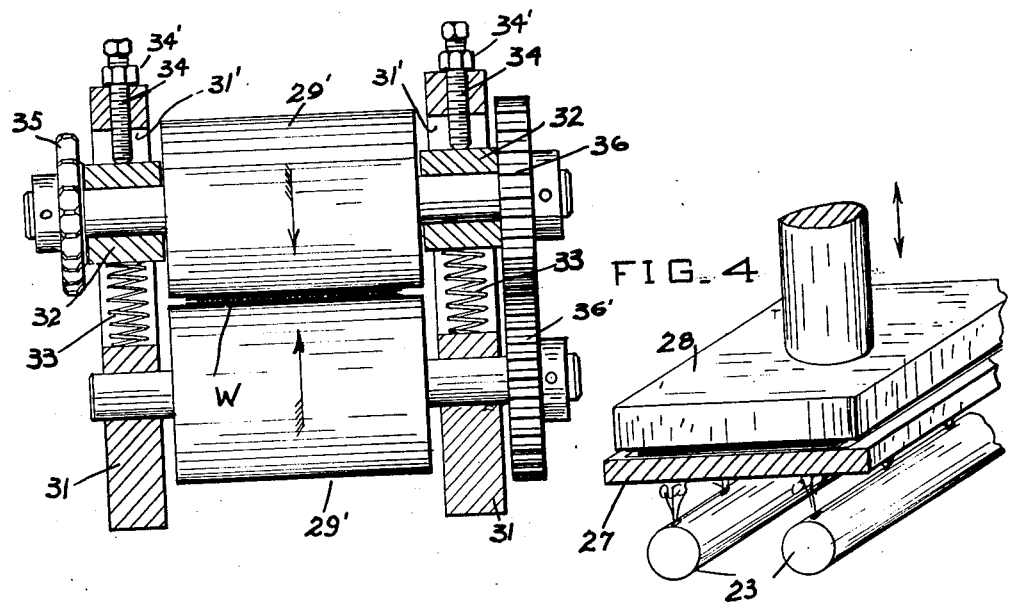
INVENTOR
PHILIP MANCUSO
BY John O. Seifert
ATTORNEY

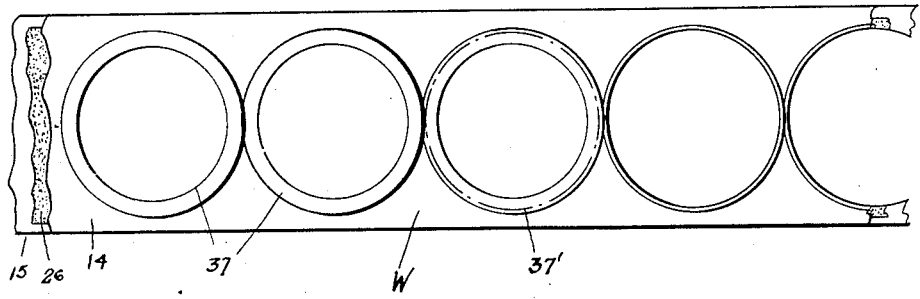
FIG_6
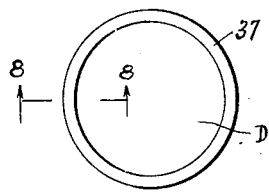
FIG_7
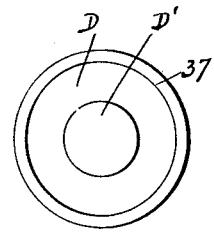
FIG_9
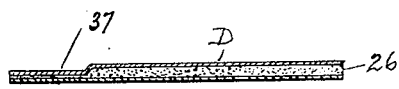
FIG_8
FIG_10
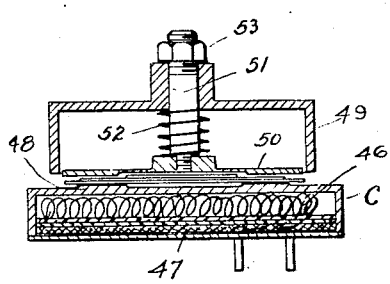
FIG_11
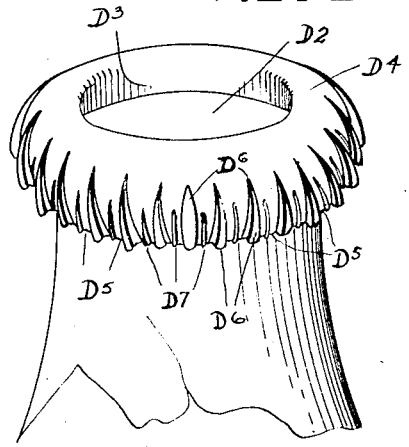
FIG_12
INVENTOR
PHILIP MANCUSO
BY John O. Leifert
ATTORNEY

UNITED STATES PATENT OFFICE 2,332,101

CONTAINER CLOSURE FORMING BLANK AND METHOD OF PRODUCING THE SAME

Philip Mancuso, Brooklyn, N. Y., assignor by mesne assignments, to Thermo-Plastic Bottle Sealing Corporation, New York, N. Y., a corporation of New York Application February 20, 1939, Serial No. 257,449

11 Claims. (Cl. 154—2)

This invention relates to a composite material, and particularly blanks of composite material to be applied as closures to the filler opening of containers to close and seal the same, and while it is particularly adapted for the producing of material for closures to close and seal the filling and pouring opening of milk and the like bottles, it is also applicable for use with other forms of containers. The composite material for closure caps of this character consists of laminated plies of fibrous material, such as paper made from spruce, commonly called "kraft" paper, united by an interposed layer of thermoplastic material having the property of being substantially rigid at normal atmospheric temperatures and adapted to be rendered plastic when subjected to an elevated temperature. The closures are formed from blanks severed from a web or sheet of such material by subjecting the blanks to an elevated temperature to soften and render the thermoplastic material plastic, or of a semi-liquid consistency, and render the material of the blanks pliable and mouldable. A blank in this condition is superposed centrally to the bottle mouth when the blank is moulded or shaped to cap form over the bottle mouth and the skirt moulded to conform to the neck of the bottle by folding and pinching together successive portions of the skirt to extend radially outward from the skirt, the thermoplastic material as it hardens or solidifies setting the closure cap in moulded form on the bottle.

In closure caps of this character for containers it is essential that the thermoplastic material be sufficient in quantity in the composite material to retain the plies of paper in moulded form. However, in producing the composite closure cap material the thermoplastic material is applied in a plastic and viscous state and should the thermoplastic material be of a sufficiently thick layer between the plies of fibrous material to retain the fibrous material in moulded closure form, the thermoplastic material will be squeezed from between the laminations of the fibrous material as the material of the blank is moulded and shaped to cap form upon the mouth of a bottle, and particularly so when the portions of the material constituting the skirt of the closure cap are folded upon themselves with the result that there will not be a sufficient quantity of the thermoplastic material to retain the fibrous plies in moulded closure form.

It is an object of the invention to provide an improved composite sheet material of this character for making closure caps for containers, and an improved method of and means for producing the same, to overcome the foregoing disadvantages of squeezing the thermoplastic material from between the fibrous plies when they are laminated and provide sufficient thermoplastic material in the composite sheet to retain the plies of fibrous material in moulded closure form.

In composite material for closure caps of this character the plies of fibrous material are relatively thin with the result that when the material is moulded to closure cap form there is a possibility that the portion of the closure material bridging the mouth of the container or bottle will be broken by an object coming in contact therewith, such as broken ice filled about the bottle in a crate or case preparatory to distributing the same.

It is a further object of the invention to provide an improved composite or laminated sheet material, and an improved method of and means for producing the same, comprising outer plies of fibrous material, such as kraft paper, and an intermediate layer of reinforcing material, such as fabric or metallic foil, and uniting or binding the paper plies to the reinforcing ply by layers of thermoplastic material interposed between the plies of the fibrous and reinforcing materials, and provide sufficient thermoplastic material in the composite sheet to retain the plies of fibrous material in moulded closure form.

Preparatory to moulding or forming closure cap material of this character to closure form upon a container to close the filler opening thereof, closure cap forming blanks in the form of disks of predetermined diameter are severed from the closure material. Should the disk be severed from the closure material with the layer of thermoplastic material at the marginal portion of the disk equal or substantially equal in thickness to the thermoplastic material in the body of the disk, the thermoplastic material at the marginal portion of the blank as it is moulded or shaped to closure cap form will be squeezed or extruded from between the peripheral portion of the fibrous plies of the composite material, and when such thermoplastic material congeals or hardens it will not only be exposed to the elements, but in handling the bottle such thermoplastic material may crumple and break away from between the peripheral portions of the closure material and foreign substances and moisture may accumulate therein rendering the same unsanitary.

It is another object to provide an improved container closure forming disk of composite material of this character to overcome the above disadvantages, consisting in subjecting the marginal peripheral portion of the disk to heat and pressure to displace the thermoplastic material from between and firmly bond together the fibrous plies of the material at the marginal portion of the disk and seal the thermoplastic material between the fibrous plies within the marginal portion of the disk.

It is a further object of the invention to provide an improved container closure forming disk of composite material of this character to overcome the disadvantages of squeezing the thermoplastic material from between the marginal portions of the fibrous plies in moulding the disk to container closure form, and an improved method of and means for producing the same, consisting in subjecting an annular portion or portions of a web or sheet of the composite material to pressure and heat to displace the thermoplastic material from between and firmly bond together the fibrous plies of the pressed together portion or portions and seal the thermoplastic material within the portion or portions bounded by said pressed together portion, and then severing the disk from the sheet or web intermediate said pressed together annular portions.

Closures of this character are particularly adapted to be moulded and shaped to closure cap form to close and seal the filler opening of glass containers, such as milk bottles. The disks of the material are of predetermined size, and preparatory to moulding the disks to closure cap form they are heated to soften the thermoplastic material and render the disk material pliable. The disk in said condition is placed upon the container with the central portion of the disk bridging the mouth of the container when the disk is shaped to cap form and simultaneously successive portions of the skirt are shaped to conform to the bottle neck and surplus portions of the material of the skirt gathered and folded upon themselves between said moulded skirt portions. Heretofore, the disk preparatory to moulding it to closure cap form upon a container has been heated to uniform temperature throughout to effect uniform softening of the thermoplastic material and make the material of the disk equally pliable throughout, and as the disk is moulded to closure cap form the tensile stresses on the fibrous plies are resisted centrally of the fibrous plies with the result that they are ruptured centrally of the disk. Furthermore, the means to fold portions of the skirt to shape it to the bottle neck is constructed and arranged to shape the cap skirt to bottles of predetermined diameter. However, in making bottles the material thereof during the cooling period is distorted at the mouth and neck of the bottle, with the result that invariably the mouth and neck of the bottle are of irregular form, either oversize or undersize, or with portions thereof of oversize and other portions of undersize, and said means is incapable of functioning to mould portions of the skirt of the closure cap to snugly fit it to the bottle neck.

It is a further object of the invention to provide an improved method of and means to overcome the above disadvantages in moulding and shaping disks of this character to closure cap form upon containers, consisting in heating and shaping the disk preparatory to moulding and shaping the same to closure cap form to render the thermoplastic material more plastic and the disk more pliable at the peripheral portion than at the central portion of the disk, then applying the disk so heated to the container and while yieldingly though firmly holding the disk to the container mouth shaping the peripheral portion to skirt form and simultaneously mould portions spaced about the skirt progressively from adjacent the portion of the disk engaging the bottle mouth to the edge of the skirt and gather and fold together surplus material of the skirt between said moulded portions and gather and pinch together surplus material of said moulded skirt portion to snugly fit and cinch the skirt to the bottle neck.

Further objects and advantages of the invention will hereinafter appear.

In the drawings accompanying and forming a part of this application,

Figure 1 is a side elevation, partly in section, of the left hand end portion of means for carrying out the invention.

Figure 1a is a side elevation, partly in section, of the right hand end portion of means for carrying out the invention.

Figure 2 is a sectional view, on an enlarged scale, taken on the line 2—2 of Figure 1.

Figure 3 is a sectional view, on an enlarged scale, taken on the line 3—3 of Figure 1.

Figure 4 is a sectional view taken on the line 4—4 of Figure 1 and showing the parts in perspective.

Figure 5 is a perspective view of a lamination or ply of fibrous material constituting a part of the closure forming material and showing the manner of applying the thermoplastic material to a surface thereof.

Figure 6 is a plan view of a portion of a web of laminated or composite closure forming material showing the manner of treating the same preparatory to severing container closure blanks from the web and showing a portion with a blank severed therefrom.

Figure 7 is a plan view of a closure forming blank.

Figure 8 is a sectional view, on an enlarged scale, of a closure forming blank, the section being taken on the line 8—8 of Figure 7.

Figure 9 is a view similar to Figure 7 showing the closure forming blank provided with a central reinforcing member.

Figure 10 is a side elevation of the blank shown in Figure 9.

Figure 11 is a sectional view of means for subjecting a blank to an elevated temperature to render the thermoplastic material more plastic and the blank more pliable at the peripheral portion than at the central portion of the blank.

Figure 12 is a perspective view of the upper portion of a container with a closure cap moulded thereon.

In carrying out the invention to provide material from which to make container closure blanks consisting of plies of fibrous material united by a layer of thermoplastic material there are provided two rolls 14, 15 of webs of such material, such as kraft paper made from spruce. The web 14 is fed into juxtaposed relation to the web 15, as by guiding the web 15 over a roller 16, then below a roller 17 and about a roller 18. The other web 14 is guided into superposed relation to the web 15 over a roller 19, then beneath a roller 20 and over the roller 18 in superposed relation to the web 15.

The webs are united by a layer of suitable thermoplastic material which is supplied to a surface of one of the webs, preferably the surface of web 15 which is uppermost as it passes over the roller 18, the thermoplastic material having the properties of being substantially rigid at normal atmospheric temperatures and adapted to be rendered plastic when subjected to an elevated temperature, a composition consisting of twenty-five percent resin and seventy-five percent terra alba having been found in practice to serve the purpose.

To supply the thermoplastic material to the surface of the web 15 the roller 16 is rotatably mounted upon a trough 21 containing the thermoplastic material in a plastic state with a peripheral portion of the roller projecting above the trough and a peripheral portion of the roller below its axis of rotation engaging in the thermoplastic in the trough. The roller as it is rotated in the direction indicated by the arrow transfers the thermoplastic material from the trough to the surface of the web contacting said roller. To maintain the thermoplastic material in a plastic state in the trough it is heated by suitable means, shown as a gas burner or burners 22 below the trough. To maintain the thermoplastic material in a plastic condition on the surface of the web 15 until the web 14 is juxtaposed thereto as it passes over the roller 18 the rollers 17, 18 are heated as by gas jets from a gas burner 23. The web 14 may also be heated, which may be effected as the web passes from the roller 20 to the roller 18, by disposing a plate 24 to extend between said rollers and below which the web passes and heating said plate and the roller 20, as by means of a gas burner 25.

Should it be desired to reinforce the portion of the web to extend transversely and centrally of the closure forming blank or blanks to bridge the mouth of the container, a web 26 of reinforcing material of less width than the fibrous plies 14, 15, preferably fabric such as cheese cloth, is fed from a roll of such material in interposed relation to and centrally of the webs 14, 15 as they pass over the roller 18. The web 26 as it passes over the roller 18 is juxtaposed to the layer of thermoplastic material on the web 15, and to unite and bond the web 14 to the fabric web 26 a layer of thermoplastic material is supplied to a surface of said web 14. For this purpose the roller 19 is mounted on a trough 21' also containing thermoplastic material in a plastic state with a peripheral portion of the roller over which the web 14 passes projecting from the trough and a peripheral portion of the roller below the axis engaging in the thermoplastic material in the trough. The thermoplastic material is maintained in plastic condition in the trough 21' by suitable heating means, shown as a gas burner or burners 22'. The roller 19 by the rotation thereof transfers the thermoplastic material from the trough to the under surface of the web 14 and said material is maintained in plastic condition until the web is juxtaposed to the fabric 26 on the roller 18 by passing below the heated roller 20 and the plate 24.

The rollers 16 and 19 are of less width than the width of the webs 14, 15 whereby the thermoplastic material is applied to the webs within the side marginal portions of the webs, as shown at 15a in Figure 5, so that said material will not be squeezed from between the side edges of the webs as they are brought into engagement in passing over roller 18, the juxtaposed webs forming a composite web W.

The rollers are intermittently rotated from suitable means (not shown) whereby to feed successive predetermined lengths of the webs, and means are provided that are operative during the period of rest of the webs to subject the juxtaposed webs to heat and pressure to effect a uniform distribution of the thermoplastic material between the webs 14, 15. This means, as shown, comprises a plate 27 over which the juxtaposed webs pass and are brought at rest, which plate is heated, as by the burner 23 (Figure 4), and a head 28 movable to predetermined position toward the plate 27 and away from said plate. As the webs are delivered from the plate 27 they are subjected to a progressively increased pressure and decreased heat to effect a uniform distribution of the thermoplastic material and bonding together of the webs. This means, as shown, comprises two pairs of positively driven intermittently rotated spaced rollers 29 and 29' between which the webs are fed to subject the juxtaposed webs to yielding pressure and heat during the feeding of the web. The pair of rollers 29 are adapted to subject the composite web to less pressure than the pair of rollers 29', and for this purpose the lower roller of each pair of rollers is supported to rotate on a fixed axis and the upper rollers are yieldingly supported to rotate on axes parallelly of the axes of the lower rollers 29, 29' and urged away from said lower rollers and means are provided to limit the movement of said rollers away from the lower rollers. The mounting of both pairs of rollers 29, 29' is the same, as shown in Figure 3 illustrating the mounting of the rollers 29'. Each of the rollers is mounted upon a shaft or provided with axial trunnions, the lower rollers being supported by the shaft or trunnions in members 31, and the trunnions of the upper rollers journaled in blocks 32 slidably mounted in slots 31' in the members 31 above and in axial alinement with the trunnions of the lower rollers. The upper rollers are supported and yieldingly urged away from the lowere rollers by springs 33, the movement of the upper rollers away from the lower rollers being limited and said movement adapted to be varied by adjustable abutments in the form of screws 34 having threaded connections with threaded openings in the upper wall of the slots 31', with the ends of the screws abutting the blocks 32 opposite the springs 33 and secured in position by lock nuts 34'. The abutments 34 for limiting the movement of the upper roller of each pair of rollers 29, 29' are adjusted so that the upper roller of the pair of rollers 29 will be urged away from the lower roller a greater distance than the upper roller of the pair of rollers 29' from its companion lower roller. The rollers 29' are positively driven from the rollers 29 for which purpose each upper roller is provided with a sprocket wheel 35 adapted for the engagement of a sprocket chain whereby the upper roller 29' is driven from the upper roller 29 and the lower roller of each pair of rollers is driven from the upper roller by a gear 36 rotatable with the upper roller meshing with a gear 36' rotatable with the lower roller.

The composite web as it is fed, is supported by plates 27', 27", or said plates may constitute a continuation of the plate 27 arranged with openings for the engagement of a peripheral portion of the lower roller of each pair of rollers with the surface of said peripheral portion of the rollers substantially in the plane of the upper surface of the plates. The rollers 29, 29' are heated by suitable means, shown as by gas burners 30, 30' disposed relative to the rollers, and the burners are arranged to heat the rollers 29 to a higher temperature than the rollers 29'.

As the composite web W is delivered from the rollers 29' the fibrous plies 14, 15 are intimately bonded toegther by the thermoplastic material when the container closure forming material consists only of a pair of plies of fibrous material and the thermoplastic material, and when the composite web is provided with the reinforcing fabric 26 the fibrous plies are intimately bonded to said fabric reinforcement by the thermoplastic material. The composite web in either case is adapted for severing container closure forming blanks therefrom. Should closure forming blanks be severed from the web with the layer of thermoplastic material of uniform thickness throughout there will be a thermoplastic layer of equal thickness at the edge of the blank severed from the web and as the blank is shaped or moulded to container closure form such thermoplastic material will be squeezed or extruded from between the peripheral portion of the fibrous plies which will not only be exposed to view, rendering the closure unsightly, but the hardened thermoplastic material in handling the container may be broken away from between the edges of the closure with the result that foreign substances and moisture may accumulate therein and render the same unsanitary. For this purpose portions of the composite web bounding the container closure forming blanks, in the form of disks, are subjected to pressure and heat to extrude or displace the major portion of the thermoplastic material from between and intimately bond together said portion or portions of the web, as shown at 37 in Figure 6, and the disk severed intermediate said pressed together portion, as indicated by dot and dash lines 37', whereby the thermoplastic material is sealed within the peripheral portion of the disk. While the disks may be severed from the composite web after it has been delivered from the rollers 29' and the thermoplastic material has hardened and is substantially rigid, preferably the disks are severed from the composite web in successive sequence to delivering the web by the rollers 29' and while the thermoplastic material is still in a substantially plastic state. The web is delivered by the rollers from the plate 27'' onto a fixed table 38 extending in the plane of said plate. A plunger 39 having a head is reciprocatory toward and away from the table and adapted to be moved into engagement with the web on the table during the periods of rest of the web. The end of the head of the plunger is recessed, as shown in dotted lines 39' in Figure 1a, providing a peripheral annular projection at the end of the head adapted to press together the annular portion 37 of the web bounding the disk to be severed from the web, the pressure extruding the major portion of the thermoplastic material from between and bonding together said portions, as hereinbefore set forth.

The displacing or extruding of the thermoplastic material from between the pressed together portion 37 tends to cause the thermoplastic material within the same to assume an irregular thickness with the result that in the subsequent moulding of the disk to closure form surplus thermoplastic material at a part of the disk may cause the fibrous plies to be ruptured. In order to arrange the thermoplastic material within the bonded together portion 37 of uniform thickness it is subjected to pressure in successive sequence to pressing together the portion or portions 37 and is effected by means of the head of the plunger 40 (Fig. 1a) brought into engagement with said portion of the web and flattening the same, as shown at 40'. The plunger 40 is connected to the plunger 39 to move in synchronism therewith by a member 41. The plungers 39, 40 may be heated by suitable means whereby to facilitate the action of the plungers on the material of the web W. In successive sequence the portions 40' constituting the disks are severed from the web intermediate the pressed together portion 37 by punches and dies, one of which is shown consisting of a punch 42 co-operating with an annular die member 43 recessed into the face of the table 38 in relation to an opening 44 therein, the punch being reciprocated toward and away from the die and passing through an opening in a stripper plate 45 spaced above the table 38, the blanks or disks D as they are severed from the web passing through the opening 44, as shown in Figure 1a.

The fibrous plies 14, 15 are of a width slightly greater than the diameter of the closure forming disks, as shown in Figure 6, and in the use of the reinforcing ply 26 said ply is disposed midway between the opposite side edges of the web and will extend transversely and centrally of the disks, or the portion that bridges the mouth of a container when the disk is shaped or moulded to closure form thereon, and is of a width equal to the diameter of the container mouth and is of slightly less width than said fibrous plies. It will be obvious that the plies 14, 15 may be of greater width and disks severed therefrom in rows extended transversely thereof, in which case in the use of a reniforcing fabric ply 26 a series of such webs 26 are provided and are spaced laterally of the plies 14, 15 and disposed centrally of the portions from which the disks are severed.

In the use of the plies without the reinforcing fabric the portion of the disk that will bridge the mouth of the container when the disk is shaped or moulded to closure form may be reinforced by a second disk of less diameter than and superposed centrally of the disk D, as shown at D' in Figures 9 and 10.

The disk is adapted to be moulded or shaped to close cap form upon the mouth of a container to close and seal the filler opening thereof, and preparatory to so applying the disk it is subjected to an elevated temperature to render the thermoplastic material plastic and the fibrous plies pliable. To prevent resistance to stresses applied to the fibrous plies in moulding the disk being taken up centrally of the disk and a consequent rupturing of the fibrous plies, the disk preparatory to moulding the same to closure form is subjected to an elevated temperature to render more plastic the thermoplastic material of an annular portion of the disk within the pressed together marginal portion and bounding the central portion of the disk adapted to span or bridge the container mouth. For this purpose there is provided an electric heating device comprising an electric resistance coil 46 arranged in a circular carrying casing C therefor with electric and heat insulating material 47 interposed between the coil and the bottom of the casing. The top of the casing constitutes a hot plate and is provided with an annular wall portion of increased thickness, as at 48, upon which the closure forming disk is adapted to be engaged with the pressed together peripheral portion and the central portion of the disk out of engagement with the top of the casing, as clearly shown in Figure 11, and thus subjecting the annular portion of the disk within the pressed together peripheral portion and bounding the central portion of the disk to a higher temperature than the remainder of the disk and rendering the thermoplastic material thereof more plastic and said portion of the disk more pliable than the central portion, whereby the stresses applied to the fibrous plies of the disk in moulding it to closure form are distributed throughout the central portion of the disk. To prevent dissipation of the heat a hood 49 is supported in superposed relation to the top of the casing C, and a plate 50 is carried by a stud 51 slidably mounted in a boss centrally of the hood to have movement into and outwardly from the hood and normally urged from the hood by a spring 52 coiled about the stud and interposed between the plate and hood, the outward movement of the plate being limited by a nut 53 threaded onto the stud outside of the hood.

After the disk has been heated as described it is placed centrally on the mouth of a container, such as a milk bottle as shown in Figure 12, and subjected to the action of means to depress the central portion of the disk into the mouth of the container, as shown at D2, and the material of the disk outwardly from said depressed portion is crimped and moulded to the inner surface of the mouth, as at D3, and then the material moulded over and into intimate contact with the lip of the container mouth, as at D4. The marginal portion of the disk is then shaped to skirt form and simultaneously portions spaced about the same commencing outwardly from the portion moulded to the lip of the container mouth and extending to the edge of the skirt are moulded to conform to the container neck, as at D5, and the surplus material of the skirt gathered and folded upon itself between said moulded portions, as at D6, and any surplus material of the moulded portions gathered upon themselves, as at D7, to snugly fit and cinch the gathered skirt to the container neck.

Having described my invention, I claim:

1. The method of producing container forming closure blanks which comprises providing a web of composite material including a pair of plies of fibrous material united by an interposed layer of thermoplastic material substantially equal to the surface area of the fibrous plies and having the property of being plastic when heated and substantially rigid and rendering the fibrous material non-pliable at normal atmospheric temperatures, subjecting to heat and pressure portions of the web of composite material bounding container closure forming blanks to extrude the major portion of the thermoplastic material from between and bonding together said portions of the fibrous plies of the web by the thermoplastic material and sealing the thermoplastic material within said bonded together portions of the plies, then subjecting the portions of the web between the bonded together portions of the plies to heat and pressure to distribute the thermoplastic material in a layer of uniform thickness between said bonded together portions and then severing said container closure forming blanks from the web intermediate said bonded together portions of the fibrous plies.

2. The method of producing container forming closure blanks which comprises providing a web of composite material including plies of fibrous material united by an interposed layer of thermoplastic material substantially equal to the surface area of the fibrous plies and having the property of being plastic when heated and substantially rigid and rendering the fibrous material non-pliable at normal atmospheric temperatures, and in successive sequence subjecting to heat and pressure portions of the composite web bounding portions to constitute container closure forming blanks to extrude the major portion of the thermoplastic material from between and bonding together the plies of the portions of said web by the thermoplastic material and seal the thermoplastic material within said bonded portions, and then severing said container closure forming blanks from the web intermediate said bonded together portions of the fibrous plies.

3. The method of producing container closure forming blanks, which comprises providing a pair of webs of fibrous material and a thermoplastic material having the property of being rendered viscous when subjected to an elevated temperature substantially rigid at atmospheric temperatures, rendering and maintaining the thermoplastic material viscous by subjecting it to an elevated temperature, applying to a surface of one of said webs a layer of the thermoplastic material in a viscous state substantially equal in width to the width of said web, subjecting said web to an elevated temperature to maintain the thermoplastic material viscous, progressively juxtaposing the other web of fibrous material to the layer of thermoplastic material on the first web, subjecting the juxtaposed webs to an elevated temperature and pressure to uniformly distribute the thermoplastic material between the webs, then subjecting the juxtaposed webs successively to increased pressure and decreased heat to unite the webs by the thermoplastic material, then subjecting to heat and pressure portions of the united webs bounding container closure forming blanks to be severed from the united webs to extrude the major portion of the thermoplastic material from between and bonding together said portions by the thermoplastic material and sealing the thermoplastic material within said bonded together portions, subjecting the webs within said bonded together portions to heat and pressure to uniformly distribute the thermoplastic material therebetween and arrange the same substantially of uniform thickness, and then severing the container closure forming blanks from the web intermediate the bonded together portions.

4. A container closure cap forming blank, consisting of a pair of disks of fibrous material and an intermediate fabric ply of the same width as the diameter of and disposed centrally of the fibrous disks, and a layer of thermoplastic material substantially equal in width to the surface area of the disks bonding the disks to the fabric ply and the disks to each other, said thermoplastic material having the property of being substantially rigid and rendering the blank non-pliable at normal atmospheric temperature and adapted to be rendered plastic and the blank pliable when subjected to an elevated temperature, and the peripheral portions of the fibrous disks bonded together in intimate contact by the thermoplastic material and sealing the layer of thermoplastic material within, said bonded together peripheral portions of the fibrous disks, and said blank within the bonded together peripheral portions of the disks when rendered pliable by subjecting the same to an elevated temperature adapted to be molded to closure cap form upon and shaped to conform to the mouth of a container without extruding the thermoplastic material from between the peripheral portions of the fibrous disks and to be retained in moulded condition sealed on the container mouth by the setting of the thermoplastic material.

5. The method of producing container closure forming blanks, which comprises providing a pair of disks of fibrous material and a ply of fabric of the same width as the diameter of the disks, applying a layer of thermoplastic material to a surface of each of the disks substantially equal to the surface area of the disks, juxtaposing the thermoplastic coated surface of the disks to the opposite surfaces of the fabric ply with said ply extending centrally between the disks to unite the disks to the fabric ply and each other, said thermoplastic material having the property of being substantially rigid and rendering the fibrous disks and fabric plies non-pliable at normal atmospheric temperature and adapted to be rendered plastic and said fibrous disks and fabric ply pliable and mouldable when heated, subjecting the peripheral portion of the united disks to heat and pressure to extrude the major portion of the thermoplastic material from between and bonding together the fibrous disks and fabric ply at the peripheral portions thereof and sealing the layer of thermoplastic material within said bonded together peripheral portions of said disks, and then severing the blank intermediate said bonded together peripheral portions.

6. The method of producing container closure forming material, which comprises providing a pair of webs of fibrous material of equal width, a web of fabric of the same width as the webs of fibrous material, and a thermoplastic material having the property of being substantially rigid at normal atmospheric temperature and adapted to be rendered viscous when subjected to an elevated temperature, intermittently feeding said webs and while feeding the webs applying to a surface of each of the webs of fibrous material the thermoplastic material in a viscous state in a continuous layer of a width to come within the side marginal portions of the webs, then while subjecting the webs of fibrous material to an elevated temperature juxtaposing the web of fabric to the layer of thermoplastic material on one of the fibrous webs centrally thereof, juxtaposing the surface of the other web of fibrous material carrying the thermoplastic material to the opposite surface of the fabric web and the other fibrous web, then during the periods of rest of the webs subjecting the juxtaposed webs to heat and pressure to distribute the thermoplastic material in a layer of uniform thickness between the webs, and then during the feeding of the webs subjecting the same to successive progressively increasing pressures and decreasing temperatures to unite the webs by the thermoplastic material.

7. The method of producing container closure forming blanks, which comprises providing a pair of webs of fibrous material and a thermoplastic material having the property of being substantially rigid at atmospheric temperature and adapted to be rendered viscous when subjected to an elevated temperature, rendering and maintaining the thermoplastic material viscous by subjecting it to an elevated temperature, intermittently feeding said webs and while feeding the webs applying a layer of the thermoplastic material in a viscous state to a surface of each of said webs, progressively juxtaposing the thermoplastic material carrying surface of one of said webs to the thermoplastic material carrying surface of the other of said webs and simultaneously interposing a web of fabric of less width than the webs of fibrous material between the thermoplastic material carrying surfaces of the fibrous webs and uniting the fibrous webs by the thermoplastic material to the fabric web and each other, then during the periods of rest subjecting the united webs to pressure and heat to uniformly distribute the thermoplastic material between said webs, then successively while feeding the united webs subjecting the webs to a progressively increased pressure and decreased temperature, then during the periods of rest subjecting to heat and pressure the portions of the united webs bounding container closure forming blanks to extrude the major portion of the thermoplastic material from between and bonding together said portions by the thermoplastic material and sealing the thermoplastic material within the bonded together portions, subjecting the united webs within the bonded together portions to pressure and heat to distribute the thermoplastic material in a layer of uniform thickness between said bonded together portions, and then severing said container closure forming blanks from the web intermediate the bonded together portions.

8. A container closure forming blank consisting of a disk including a pair of fibrous plies and an interposed layer of thermoplastic material having the property of being substantially rigid and rendering the blank non-pliable at normal atmospheric temperature and adapted to be rendered plastic and the disk pliable when subjected to an elevated temperature, said disk having the major portion of the thermoplastic material displaced from between and bonded together in intimate contact at the peripheral portion of the fibrous plies by the thermoplastic material and sealing the layer of thermoplastic material between the fibrous plies within said bonded together peripheral portions of the fibrous plies.

9. A container closure cap forming blank consisting of a disk including a pair of fibrous plies and a fabric ply of the same width as the diameter of the fibrous plies extending transversely and centrally between the fibrous plies, and a layer of thermoplastic material disposed between said fabric and the fibrous plies and the thermoplastic material having the property of being substantially rigid and rendering the blank non-pliable at normal atmospheric temperature and adapted to be rendered viscous and the blank pliable when subjected to an elevated temperature, the major portion of the thermoplastic material being displaced from between the peripheral portions of the fibrous plies and said peripheral portions bonded together by the thermoplastic material and sealing the layer of thermoplastic material between the fibrous plies within said bonded together peripheral portions.

10. The method of producing container closure forming blanks, consisting in providing a pair of plies of fibrous material and thermoplastic material having the property of being substantially rigid at normal atmospheric temperature and adapted to be rendered viscous when subjected to an elevated temperature, applying a layer of thermoplastic material in a viscous state to a surface of one of the fibrous plies, juxtaposing the other fibrous ply to said layer of thermoplastic material on the one ply, subjecting the peripheral portions of the fibrous plies so united to heat and pressure to extrude the major portion of the thermoplastic material from between the peripheral portions of the fibrous plies and bonding together said peripheral portions of the fibrous plies by the thermoplastic material and sealing the layer of thermoplastic material between said plies within the bonded together peripheral portions, and then severing the blank intermediate said bonded together peripheral portions of the fibrous plies.

11. The method of producing container closure forming material, which comprises providing a pair of webs of fibrous material of equal width, intermittently feeding the webs and while feeding the webs applying to a surface of one of the webs a layer of thermoplastic material substantially equal in width to the width of said web, said thermoplastic material having the property of being substantially rigid at normal atmospheric temperature and rendered plastic when heated, juxtaposing the other web of fibrous material upon the layer of thermoplastic material upon the surface of the first web, subjecting the juxtaposed webs during the periods of rest of the webs to heat and pressure to distribute the thermoplastic material in a layer of uniform thickness between the webs, and then during the feeding of the webs subjecting the juxtaposed webs to successive progressively increasing pressures to unite the webs by the thermoplastic material.

PHILIP MANCUSO.